United States Patent [19]

Cordier et al.

[11] 4,102,303

[45] Jul. 25, 1978

[54] PROCESS AND PAINT SPRAY BOOTH USING A WASHING LIQUID AND REUSE THEREOF

[75] Inventors: André Guy Cordier, Montrouge; John George Stockholm, Vernouillet, both of France

[73] Assignee: Air Industrie, Courbevoie, France

[21] Appl. No.: 629,417

[22] Filed: Nov. 6, 1975

[30] Foreign Application Priority Data

Nov. 18, 1974 [FR] France .................................. 74 37934

[51] Int. Cl.² .............................................. B05B 1/28
[52] U.S. Cl. ...................................... 118/326; 55/85;
   55/228; 98/115 SB; 118/DIG. 7
[58] Field of Search ................ 55/1, 84, 85, 89, 95,
   55/228, 240, 241; 98/115 SB; 261/DIG. 54,
   108, 109; 118/603, 610, 326, DIG. 7

[56] References Cited

U.S. PATENT DOCUMENTS

| | | | |
|---|---|---|---|
| 2,142,406 | 1/1939 | Nonhebel et al. | 55/228 |
| 2,337,983 | 12/1943 | Fisher | 98/115 |
| 3,138,087 | 6/1964 | Larsson et al. | 98/115 SB |
| 3,396,514 | 8/1968 | Hurst et al. | 55/85 |
| 3,633,340 | 1/1972 | Illingworth | 55/84 |
| 3,635,000 | 1/1972 | Brown | 55/89 |
| 3,795,093 | 3/1974 | Gerhard et al. | 55/240 |
| 3,861,887 | 1/1975 | Forney | 55/85 |
| 3,884,651 | 5/1975 | Velegol | 55/95 |

*Primary Examiner*—Bernard Nozick
*Attorney, Agent, or Firm*—Stephen E. Feldman; Marvin Feldman

[57] ABSTRACT

The invention relates to the continuous treatment of a washing liquid for a gas laden with particles. The particle-laden liquid after washing is recycled and used again in admixture with clean liquid.

6 Claims, 2 Drawing Figures

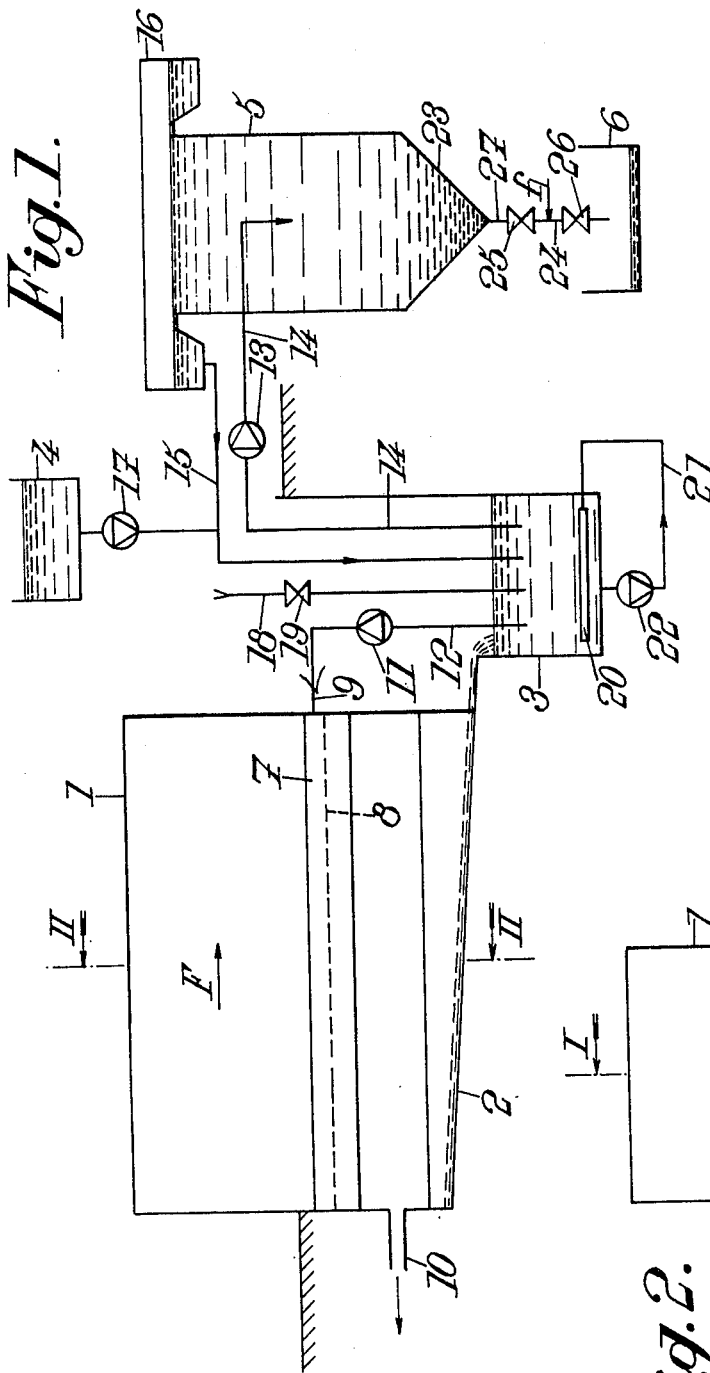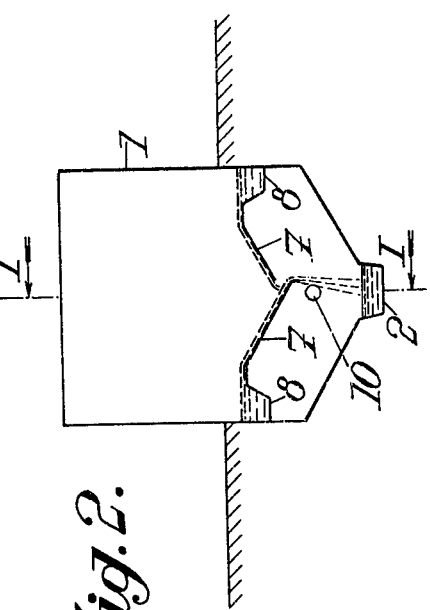

PROCESS AND PAINT SPRAY BOOTH USING A WASHING LIQUID AND REUSE THEREOF

This invention relates to a process for the continuous treatment of a washing liquid for a gas laden with particles of a product non-miscible in said liquid, in order to separate the said liquid and said product, wherein the said particle-laden gas is passed through a flow of the said washing liquid and some of the particle-laden liquid is subjected to settling in order to effect said separation and recover the purified liquid.

The invention may relate particularly to a process for continuously treating a liquid for washing the air of a paint cabin in which articles are paint-sprayed as is the case, more particularly, with motor-vehicle bodies. In that case, the particles in question are of course paint particles. The washing liquid usually consists of a mixture of water and a denaturing product intended to produce a dispersion of the paint particles in the liquid and eliminate any adhesive power therefrom so as to obviate agglutination of the particles to one another.

This method of applying paint by spraying is of course accompanied by appreciable paint losses, inter alia due to deposition on the walls of the cabin. Unless such deposits are eliminated continuously, frequent interruption to cabin operation is necessary to scrape the walls; this cleaning is a long and complicated process and, in particular, reduces the paint cabin yielding. Provision is therefore now being made for continuously preventing or at least limiting as far as possible paint deposits on the walls of the cabins by evacuating the cabin air laden with paint particles in suspension, through a flow of washing liquid as indicated hereinbefore.

The paint particles are then transferred from the cabin air to the washing liquid which is then continuously processed, inter alia so that the paint and purified liquid can be separately recovered. To this end, the particle-laden washing liquid flows in a channel disposed beneath the cabin and is then fed to a settling tank in which separation of the washing liquid and paint are effected by settling. Generally, the greater part of the washing liquid, i.e. more than 50%, is treated in this way by storing it for a given time in the settling tank so that the paint can be eliminated by means of mechanical scraper systems, the paint separated from the washing liquid being either in the form of a deposit on the bottom of the settling tank or in the form of a floating foam.

In most cases, the use of such a process requires very large volume settling or flotation equipment, i.e. of a volume of several hundred cubic meters and even 1,000 cubic meters and more in the case of a paint cabin of a conventional length of 60 meters. Consequently, the scraper systems required to eliminate the paint are very large and expensive and readily foul. These systems therefore require expensive maintenance due to the frequent cleaning operations required, and make it necessary to empty the settling tank so that cabin operation has to stop, with the same drawback as regards output.

The object of this invention is to obviate these disadvantages by providing a process whereby separation of the washing liquid and the paint can be effected by settling in equipment of much smaller dimensions than those of the equipment used heretofore.

To this end, a process for the continuous treatment of a washing liquid for a particle-laden gas according to the invention is characterised in that the majority of the particle-laden liquid is recycled to use it as a gas washing liquid in mixture with clean liquid, only a small proportion of the said particle-laden liquid being subjected to settling on each cycle.

With this process, it is possible to limit the amount of washing liquid used since the greater part of this liquid is recycled after being laden with the paint particles, and can then be directly re-used as a washing liquid in mixture with a small quantity of purified liquid. Also, since only a small amount of washing liquid undergoes settling on each cycle, a process according to the invention can be used with a settling tank of much smaller dimensions than those of the settling tanks used in the above-mentioned conventional methods. The invention thus gives an appreciable saving as regards construction and operating costs of the installation.

Preferably, at least 95% by volume of the particle-laden liquid is recycled, 5% by volume maximum of said liquid being subjected to settling on each cycle.

The reason for this is that it has been found sufficient to subject only about 5% by volume of the particle-laden washing liquid to settling on each cycle to recover all the paint lost in the cabin as a result of spraying.

Preferably, the said purified liquid obtained after settling is recycled to form at least some of the said clean liquid.

This feature, of course, reduces the amount of water required for washing the particle-laden air.

When a denaturing product adapted to eliminate the adhesive power of the paint particles and disperse them in the liquid is added to the washing liquid, said denaturing product is preferably added to a flow of the clean liquid thus giving good homogeneity of the washing liquid.

In the specific but frequent case in which the paint contains solvents of the xylene and toluene type (glycerophthalic, acrylic and epoxy) or is of the non-aqueous dispersion type in which the liquid part contains oils of the aliphatic group, advantageously the said denaturing product consists of at least one alkaline agent and at least one polyether, with the following formula:

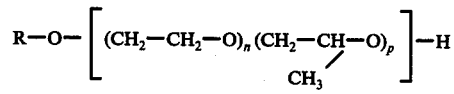

where R is an alkyl, aryl alkyl, aryl or alkyl aryl group; and n and p are integers, one of which may be zero, the sum $n + p$ being at least 12.

Of course, if the paint is of a different type, a different product may be used, the main point being that the product in question should be adapted to denature the paint, i.e. disperse the particles thereof in the washing liquid if necessary so that the liquid can be re-used in that form, and eliminate the adhesive power of the paint.

The present invention also relates to an installation for carrying out the process as defined hereinbefore in any of its variants, said installation comprising a collecting system in which a flowing wash liquid has a particle-laden gas flowing through it and said liquid flows into a recovery channel, and a settling tank to which some of the liquid recovered in the channel is fed.

According to the invention, an installation of this kind is characterised in that it comprises first means adapted to recirculate most of the liquid recovered in the channel to the collecting system and second means adapted to feed a small proportion of said liquid recovered in said channel to the settling tank.

Preferably, the rate of flow in the said first means is between approximately 100 and approximately 20 times the rate of flow in the said second means.

Advantageously, an installation according to the invention may be further characterised in that the said first and second means are connected to a recycling pit fed by the said recovery channel.

The installation may also comprise, firstly, means for supplying said recycling pit with clean liquid, and secondly, means for recirculating liquid purified in the settling tank to the recycling pit.

Where an installation according to the invention is adapted to process the washing liquid for the air from a paint cabin, it may also comprise means for supplying a paint denaturing product to the recylcing pit, such a means preferably communicating with the aforementioned means for recirculating the purified liquid from the settling tank to the pit, in order to ensure uniform distribution of the denaturing product in the washing liquid.

Means may also be provided for agitating the liquid in the recycling pit to prevent settling taking place between the paint and the washing liquid in the pit.

Other advantages of the invention will be apparent from the following example of one embodiment of an installation according to the invention which is given without any limiting force and which is intended for performing the process, with reference to the accompanying drawing wherein:

FIG. 1 diagrammatically illustrates an installation according to the invention for treating the liquid for washing the air drawn from a paint cabin, the latter being shown in section on the line I—I in FIG. 2, and FIG. 2 shows the paint cabin in cross-section on the line II—II in FIG. 1.

The installation illustrated in the drawings consists essentially of a paint cabin 1 of the 'tunnel' type, through which articles requiring to be paint-sprayed, for example motorvehicle bodies, are passed in the direction of arrow F; an inclined recovery channel 2 disposed beneath the paint cabin 1 and leading into a recycling pit 3; a denaturing product tank 4; a settling tank 5; and a tank 6 disposed beneath the settling tank.

A system for collecting the fine drops of paint which are dispersed in the cabin air during spraying is arranged in the paint cabin 1 and along its entire length. This collecting system consists of two inclined walls 7 in the form of a V over which a washing liquid trickles and finally flows into the inclined recovery channel 2 as it passes between the slightly spaced bottom edges of the two inclined walls 7. The washing liquid is fed over these two walls by two longitudinal overflow chutes 8 which are fed by a conduit 9. The air laden with fine paint particles originating in the top of the cabin is drawn out via an aperture 10 leading into the bottom part of the cabin so that it has to pass through the flow of washing liquid on the inclined walls 7, and consequently the paint particles are transferred from the air to this liquid and discharged from the cabin via the inclined channel 2.

The installation also comprises a first pump 11 connected to a conduit 12 which connects the recycling pit 3 to the said conduit 9, a second pump 13 connected to a conduit 14 connecting the recycling pit to the settling tank 5, a conduit 15 connecting the bottom of an outer circular chute 16 of the settling tank to the recycling pit, the purified liquid overflowing into said chute 16, and a metering pump 17 connecting the bottom of the denaturing product tank 4 to said conduit 15.

The recycling pit 3 can also be supplied with clean feed water via a conduit 18 to which a shut-off valve 19 is connected.

Finally, the recycling pit 3 is provided with means for agitating the liquid it contains in order to prevent such liquid from settling, said means comprising an injector bank 20 connected to the bottom of the pit by means of a conduit 21 and a pump 22.

The conical base 23 of the settling tank is adapted to receive the paint separated from the washing liquid by settling and can communicate with the said tank 6 via a lock 24 provided between two shut-off valves 25 and 26 in a discharge conduit 27.

The installation as described above operates as follows:

The recycling pit 3 is first supplied with clean washing water from the source 18, the shut-off valve 19 being open, and with a denaturing product from the tank 4, via the metering pump 17. When the recycling pit 3 is sufficiently filled, pump 11 is started to feed washing liquid via the conduits 12 and 9 into the overflow chutes 8 from which the liquid overflows and trickles over the inclined walls 7 of the collecting system. The operation of spraying the paint in the cabin 1 can then start, the air which leaves the cabin via the aperture 10 being previously washed by the flowing liquid, such liquid then collecting the paint particles suspended in the cabin air as indicated hereinbefore. Pump 13 is then started to feed the settling tank 5 with washing liquid, the shut-off valves 25 and 26 for the tank 5 being closed.

The respective speeds of the pumps 11 and 13 are so controlled that the rate of flow in the conduits 12 and 9 is between approximately 20 and approximately 100 times the rate of flow in the conduit 14.

When there is sufficient water as required for operation of the installation, valve 19 is closed to stop the supply of clean water to the recycling pit. The operation of the installation then reaches a stable equilibrium, the washing water laden with the paint particles dropping into the inclined recovery tank 2 then flowing continuously into the recycling pit 3 from which it is taken up by the pump 11 to be recycled to the collecting system in a proportion of at least 95%; the remainder of the particle-laden washing water, i.e. 5% maximum, is drawn from the recycling pit by the pump 13 to be fed to the settling tank 5 in which there is a gradual settlement between the washing liquid mixed with the denaturing product on the one hand and the paint on the other hand, the latter collecting in the conical base 23 of the settling tank, while the purified liquid overflows into the outer chute 16, from which it returns to the recycling pit via the conduit 15. The liquid drawn from the pit via the pump 11 is therefore a mixture of particle-laden washing liquid and washing liquid purified in the settling tank.

After a given time, e.g. 6 hours, when a certain amount of paint has collected at the bottom of the settling tank, the shut-off valve 25 is opened while valve 26 remains closed. A quantity of compressed air is then injected into the lock 24 between these two valves by closing valve 25 and opening valve 26, so that the paint collected in the lock 24 can be discharged to tank 6.

Valve 26 is then closed and the supply of compressed air is interrupted until the next stage of emptying the settling tank. The injection of compressed air into the lock 24 is shown diagrammatically by arrow f in FIG. 1. If the denaturing product concentration in the liquid in the recycling pit 3 is found to decrease, a certain amount of the product is added to the pit by re-starting the metering pump 17. Since this denaturing product is fed to the pit 3 via the conduit 15, the denaturing product has very good homogeneity in the washing liquid.

If the water in the pit is found to decrease, e.g. due to evaporation, it is possible to add to it by temporarily opening valve 19.

When the operation of the paint cabin 1 is to be stopped, the supply of liquid to its collecting system is stopped by stopping the pump 11; the liquid from the inclined channel 2 will then collect in the recycling pit 3, from which it can be discharged to an ancillary pit (not shown) used as a storage pool.

The above-described installation is very simple and relatively cheap to operate since the settling tank used can have dimensions very much less than those of settling tanks used in prior art installations, the reason for this being that only a small amount of the liquid undergoes settlement on each cycle since practically all the washing liquid is recycled in the paint cabin collecting system.

As already indicated hereinbefore, if the paint contains solvents of the xylene and toluene type, as is the case with glycerophthalic, acrylic and epoxy paints, or alternatively when the paint is of the non-aqueous dispersion type in which the liquid part contains oils of the aliphatic group, the denaturing product advantageously consists of at least one alkaline agent and at least one polyether of the following formula:

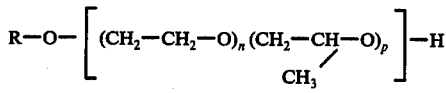

where R is an alkyl, arylalkyl, aryl or alkylaryl group; and $n$ and $p$ are integers, one of which may be zero, the sum $n + p$ being at least 12.

The installation according to the invention also has the advantage of enabling the paint collected by the collecting system to be recovered in the settling tank 5 without scraper systems or other mechanical devices being required to be immersed in the settling tanks, with their need for long and expensive maintenance requiring stoppage of the operation of the paint cabin.

It was stated above that the recycling pit was provided with an injector bank 20 connected to the bottom of the pit via a conduit 21 and a pump 22 to prevent any settlement in the pit; these means have of course been described solely by way of example and can be replaced by any means adapted to the same result, e.g. mechanical agitators.

In order also to avoid any unrequired settling of the paint in the various conduits, their section is such that the speed of flow of the liquid in these conduits and in the inclined channel 2 is at least 1 meter per second.

The settling tank 5 can be replaced by a number of smaller volume settling tanks of cylindrical or square section; the various usable settling tanks may also be disposed on the surface or be buried, in which case an additional pump must be provided in the conduit 15 for the recirculation of the purified liquid in the recycling pit 3.

The above-described installation can be readily made automatic, it being possible to draw the paint from the settling tank or tanks automatically by means of timer type controls. The denaturing product can also be supplied automatically, particularly in cases where it is of the above-mentioned type, by measuring the alkalinity of the washing liquid in the recycling pit 3, or alternatively by deposit sensors in the settling tank 5, the alkalinity detector or deposit sensor being able to control the metering pump 17.

It will of course be apparent from the foregoing that the invention is in no way limited to those of its applications nor to those embodiments of its various parts which have been more particularly described, but covers all variants thereof.

We claim:

1. A process for purification of a gas laden with fine paint particles, comprising washing by a liquid in which the fine paint particles are non-miscible comprising passing the particle laden gas through the washing liquid, collecting the liquid which has washed the gas, and which is laden with fine particles in suspension, and dividing the washing liquid laden with fine particles into two streams of different flow rates, a first stream which is recycled to said washing step from the collection without undergoing substantial settling, and a second stream which is of a lesser flow rate than that of the first stream and which undergoes settling during which the particles in suspension are separated from the liquid itself, the second liquid now being cleaned, and combining and recycling the clean second liquid with the first recycled liquid to the washing step.

2. The process of claim 1, wherein the flow rate of said first stream which is recycled without having undergone settling is at least equal to 95% of the flow rate of the washing liquid.

3. The process of claim 1, in which the fine particles are paint particles which contain solvents of xylene and toluene type (glycerophthalic, acrylic and epoxy) or which is of a non-aqueous dispersion type in which the liquid part contains oils of the aliphatic group, wherein there is added to the washing liquid a denaturing product which is suitable for removing the adherent power of the particles in the event that the paint has a liquid organic base, to disperse them, this denaturing product being composed of at least an alkaline agent and at least a polyether whose formula is as follows:

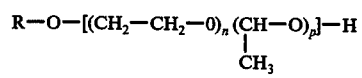

in which R is an alkyl, aryl-alkyl, aryl or alkyl-aryl group and $n$ and $p$ are integers one of which may be zero, the sum $n + p$ being at least 12.

4. An apparatus for washing gas laden with fine paint particles by a liquid in which these fine particles are non-miscible, comprising a chamber in which a paint is sprayed on objects; means for spraying the objects, feeding means for flowing a washing liquid into the chamber; discharge means for discharging the washing liquid with the fine paint particles from the chamber discharging to a tank; extraction means for evacuating the air from the chamber, arranged to let said air cross the flow of washing liquid; a first conduit for a direct recycling of the washing liquid to the chamber connecting said discharge tank to said feeding means; a settling tank provided at its lower part with collecting means of the deposit of said paint particles, a third conduit for indirect recycling, connecting the upper part of the settling tank to said discharge tank; and means of regulating the relative flow rates in the first and second conduits, arranged so that the flow rate into the first conduit is at least equal to approximately twenty times the flow rate into the second conduit.

5. The apparatus of claim 4 wherein said discharge tank comprises a recycling pit provided with agitating means to prevent settling therein.

6. The apparatus of claim 5 comprising means of inflow of a denaturing product into the recycling pit, said means communicating with said third conduit.

* * * * *